(12) United States Patent
Takeshita et al.

(10) Patent No.: US 7,466,967 B2
(45) Date of Patent: Dec. 16, 2008

(54) COMMUNICATION SYSTEM

(75) Inventors: Naoyuki Takeshita, Fukuoka (JP); Toshikazu Senuki, Fukuoka (JP); Tetsuya Yasui, Fukuoka (JP); Shinichirou Miyajima, Fukuoka (JP); Yuji Ishii, Fukuoka (JP); Katsuhiro Eguchi, Fukuoka (JP); Masahiro Abe, Fukuoka (JP); Jun Endoh, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 617 days.

(21) Appl. No.: 11/270,283

(22) Filed: Nov. 8, 2005

(65) Prior Publication Data

US 2006/0056242 A1    Mar. 16, 2006

Related U.S. Application Data

(63) Continuation of application No. PCT/JP03/08812, filed on Jul. 10, 2003.

(51) Int. Cl.
*H04B 7/00* (2006.01)

(52) U.S. Cl. .................. 455/130; 455/436; 455/442; 455/448; 370/335

(58) Field of Classification Search .......... 455/130, 455/437–439, 442, 443, 444–446, 447, 450, 455/453; 370/335
See application file for complete search history.

(56) References Cited

U.S. PATENT DOCUMENTS

| | | | |
|---|---|---|---|
| 5,901,149 A | 5/1999 | Itakura et al. | |
| 6,041,161 A * | 3/2000 | Okamoto et al. | 386/112 |
| 6,151,479 A * | 11/2000 | Kummer | 725/70 |
| 6,460,097 B1 | 10/2002 | Harumoto et al. | |
| 7,269,420 B2 * | 9/2007 | Heo et al. | 455/436 |
| 2002/0076196 A1 | 6/2002 | Nagata et al. | |

FOREIGN PATENT DOCUMENTS

| | | |
|---|---|---|
| EP | 1 217 845 | 6/2002 |
| JP | 8-153368 | 6/1996 |
| JP | 08191330 | 7/1996 |
| JP | 2000-083068 | 3/2000 |
| JP | 2002-185920 | 6/2002 |

OTHER PUBLICATIONS

Japanese Office Action with partial translation, dated Feb. 26, 2008, from corresponding Japanese Application JP 2005-503859.
International Search Report dated Aug. 26, 2003.

* cited by examiner

*Primary Examiner*—Tony T Nguyen
(74) *Attorney, Agent, or Firm*—Katten Muchin Rosenman LLP (57) ABSTRACT

A communication system that can improve communication quality by accurately re-creating reproduction timing at the receiving end even at the time of receiving VBR data or in the case of the occurrence of a packet loss. A send rate recognition section recognizes a send rate from a time stamp. A memory stores data. A dummy data addition section adds dummy data for correcting the difference between a read rate set for reading out data from the memory and the send rate to the data written to the memory. A read clock generation section generates a read clock which is equal to the read rate. A dummy data removal section removes the dummy data from the data read out from the memory on the basis of the read clock.

3 Claims, 10 Drawing Sheets

COMMUNICATION SYSTEM

This application is a continuing application, filed under 35 U.S.C. §111(a), of International Application PCT/JP2003/008812, filed on Jul. 10, 2003.

BACKGROUND OF THE INVENTION (1) Field of the Invention

This invention relates to a communication system and, more particularly, to a communication system for performing telecommunication on an asynchronous network.

(2) Description of the Related Art

With an explosive increase in traffic on IP networks the nucleus of which is the Internet, in recent years image/speech data has been delivered extensively. It is hoped that more advanced services will be provided in a wider area.

To transmit image/speech data in real time, sending timing must match receiving timing. With asynchronous IP networks, however, a sending end and a receiving end do not have a common reference clock. Accordingly, a receiver must generate data which is in synchronization with a clock at the sending end. Processes, such as decoding, are performed on this data.

Figure 10:
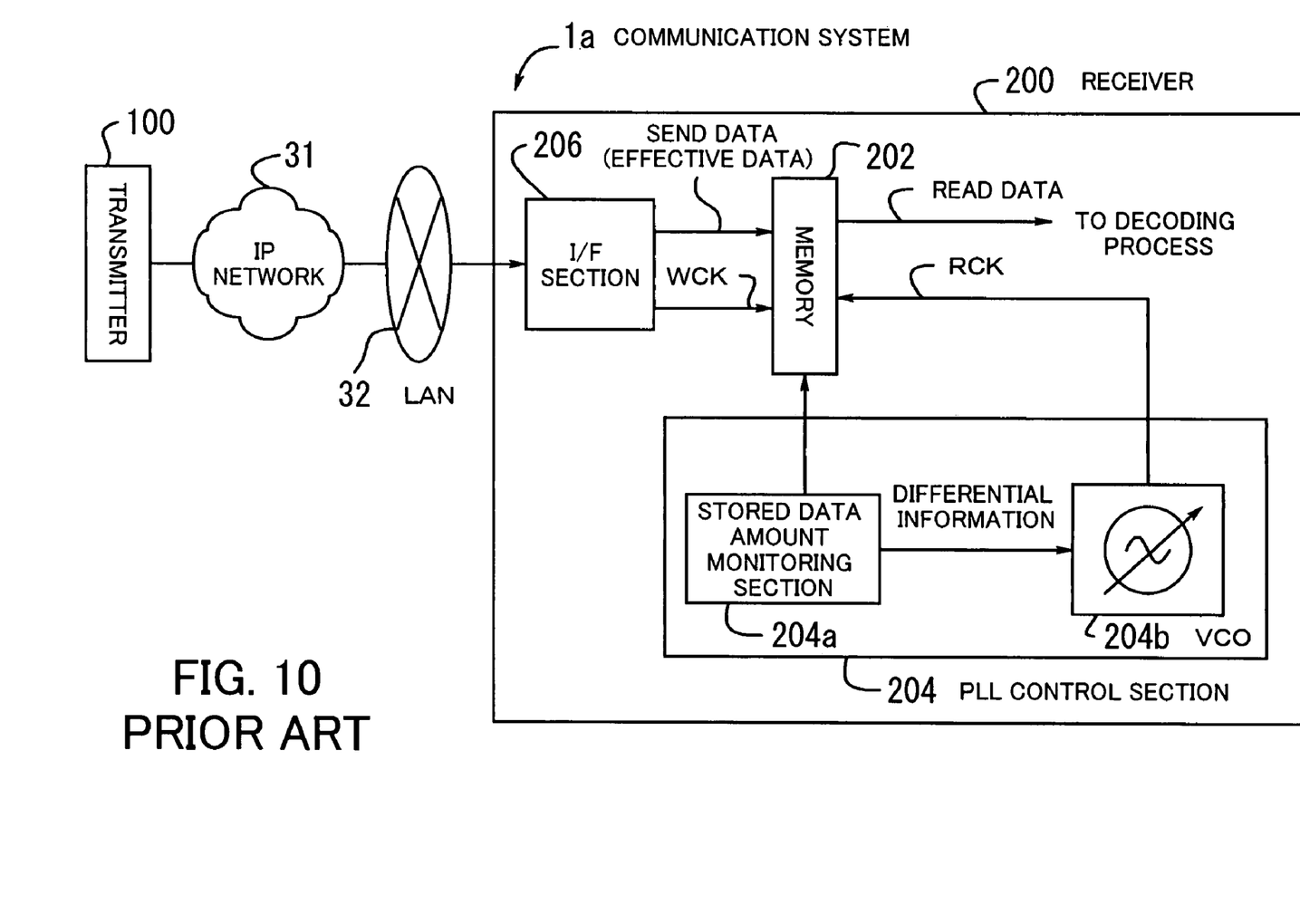
FIG. 10 shows the configuration of a communication system using a conventional receiver.

FIG. 10 shows the configuration of a communication system using a conventional receiver. A communication system 1a is used for performing constant bit rate (CBR) communication in which a certain band of traffic is secured by using a fixed transmission rate. A transmitter 100 is connected to an IP network 31. The IP network 31 is connected to a LAN 32. The LAN 32 is connected to a receiver 200.

The receiver 200 includes an I/F section 206, a memory 202, and a phase locked loop (PLL) control section 204. The PLL control section 204 includes a stored data amount monitoring section 204a and a voltage controlled oscillator (VCO) 204b.

When the I/F section 206 receives send data sent from the transmitter 100 via the IP network 31 and the LAN 32, the I/F section 206 extracts effective data from the send data and sends it to the memory 202. The I/F section 206 also outputs a transmission clock on the LAN 32 connected thereto as a write clock WCK used for writing data to the memory 202.

To be concrete, the I/F section 206 corresponds to a network interface card (NIC), being a expansion card used for connecting a personal computer, a printer, or the like to a LAN. If the LAN 32 is, for example, 10 megabit Ethernet (registered trademark), then the rate of the write clock WCK is 10 Mb/s.

The effective data is written to the memory 202 by using the write clock WCK and is read out from the memory 202 by using a read clock RCK. The stored data amount monitoring section 204a monitors the differential between the amount of data stored in the memory 202 and a set threshold, and outputs differential information.

The VCO 204b changes its oscillation frequency on the basis of the differential information so that the differential between the amount of data stored in the memory 202 and the set threshold will become zero, and generates and outputs the read clock RCK.

That is to say, if the VCO 204b recognizes on the basis of the differential information that the amount of data stored in the memory 202 is smaller than the set threshold, then the VCO 204b makes the read clock RCK slow and reads out the data from the memory 202. On the other hand, if the VCO 204b recognizes on the basis of the differential information that the amount of data stored in the memory 202 is greater than the set threshold, then the VCO 204b makes the read clock RCK fast and reads out the data from the memory 202. By doing so, the VCO 204b keeps the amount of data stored in the memory 202 constant (that is to say, the VCO 204b keeps the read clock RCK constant)

As stated above, data is sent at a constant rate, and control is exercised over reading so that the amount of data stored in the memory 202 included in the receiver 200 will be constant (however, the rate of the write clock WCK is slower than or equal to the rate of the read clock RCK). As a result, read data can be generated in synchronization with the send rate.

A technique in which, at a sending end, time information regarding an asynchronous clock is counted with a clock used on a synchronous network as reference and a count is added to a packet as a time stamp and in which, at a receiving end, reproduction timing is generated on the basis of the time stamp with the clock used on the synchronous network as reference has conventionally been proposed as a technique for re-creating reproduction timing at the receiving end (see, for example, Japanese Patent No. 2861515, paragraphs [0024]-[0026] and FIG. 1).

The receiver 200 shown in FIG. 10 is applicable to CBR communication in which a bit rate is fixed. With MPEG compression of a picture, variable bit rate (VBR) communication in which a large number of bits are assigned to a portion where a pattern is complex and in which a small number of bits are assigned to a portion where a pattern is simple is used. The receiver 200 shown in FIG. 10 is not applicable to such VBR communication.

It is assumed that a transmission rate is 6 Mb/s. With the CBR communication, the number of bits is 6 Mb at any time, so the amount of data stored in the memory 202 increases at a constant rate. Accordingly, to keep the amount of data stored in the memory 202 constant, a threshold is set, PLL control is exercised, and reading is performed at a constant read rate. This is the conventional way. By doing so, data can be read out from the memory 202 at the intervals at which data is generated at a sending end.

On the other hand, with the VBR communication the number of bits differs among different portions (if a transmission rate is 6 Mb/s, then the total number of bits in some time zone is 6 Mb), so the amount of data stored in the memory 202 does not increase at a constant rate. If the conventional PLL control in which the amount of data stored in the memory 202 is kept constant by using a fixed threshold is exercised in such a state, then a read clock synchronized with a clock at a sending end cannot be reproduced and therefore data cannot be read out accurately from the memory 202 at the intervals at which data is generated at the sending end. This causes the problem of, for example, a color shear in an image or speech slowness/fast forward.

Moreover, if a packet loss occurred on the IP network 31, the receiver 200 cannot accurately re-create the intervals at which data is generated at the sending end for the same reason that is stated in the case of receiving VBR data. In addition, with the conventional technique (disclosed in Japanese Patent No. 2861515), a reproduction clock is generated at the receiving end on the basis of the clock used on the synchronous network on the condition that packet communication is performed between a transmitter and a receiver which are asynchronous to each other on the network on which synchronization is established by the clock. Accordingly, this technique is not applicable to packet communication on a completely asynchronous network.

SUMMARY OF THE INVENTION

The present invention was made under the background circumstances described above. An object of the present invention is to provide a communication system which improves communication quality by accurately re-creating reproduction timing at a receiving end even at the time of receiving VBR data or in the case of the occurrence of a packet loss.

In order to achieve the above object, a communication system for performing telecommunication is provided. This communication system comprises a transmitter for sending packets each including a time stamp and a receiver including a send rate recognition section for recognizing a send rate from the time stamp, a memory for storing receive data, a data addition section for adding, at the time of setting a read rate used for reading out data from the memory, data for correcting a difference between the read rate and the send rate to data written to the memory, a read clock generation section for generating a read clock according to the read rate, and a data removal section for removing the data added from the data read out from the memory on the basis of the read clock.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENT

Figure 1:
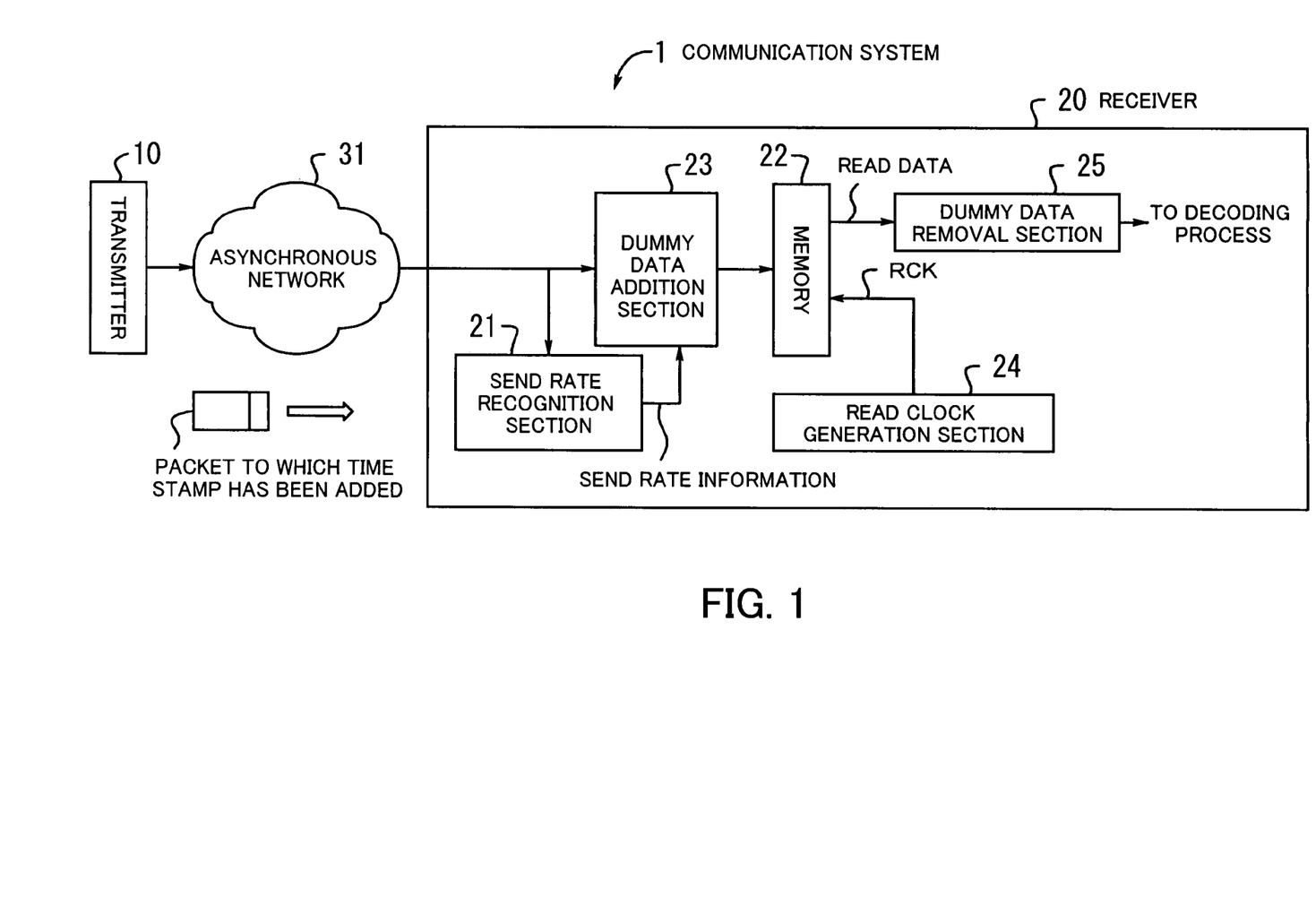
FIG. 1 is a view for describing the principles underlying a communication system according to the present invention.

An embodiment of the present invention will now be described with reference to the drawings. FIG. 1 is a view for describing the principles underlying a communication system according to the present invention. A communication system 1 includes a transmitter 10 and a receiver 20 and is used for performing telecommunication via an asynchronous network (IP network) 31.

The transmitter 10 adds a time stamp, being time information, to a packet and sends the packet. A send rate recognition section 21 included in the receiver 20 recognizes a send rate (send bit rate) from the time stamp. A memory 22 stores data (correction data) obtained by adding dummy data to send data at need.

When a read rate at which data is read out from the memory 22 is set, a data addition section (hereinafter referred to as a dummy data addition section) 23 adds data (dummy data) for correcting the difference between the read rate and the send rate to the data to be written to the memory 22.

A read clock generation section 24 generates a read clock RCK which corresponds to the set read rate (which is equal to the set read rate). A data removal section (hereinafter referred to as a dummy data removal section) 25 extracts the dummy data added from the data read out from the memory 22 by using the read clock RCK, and removes the dummy data added. The data from which the dummy data has been removed is decoded by a processing section at a subsequent stage.

Figure 2:
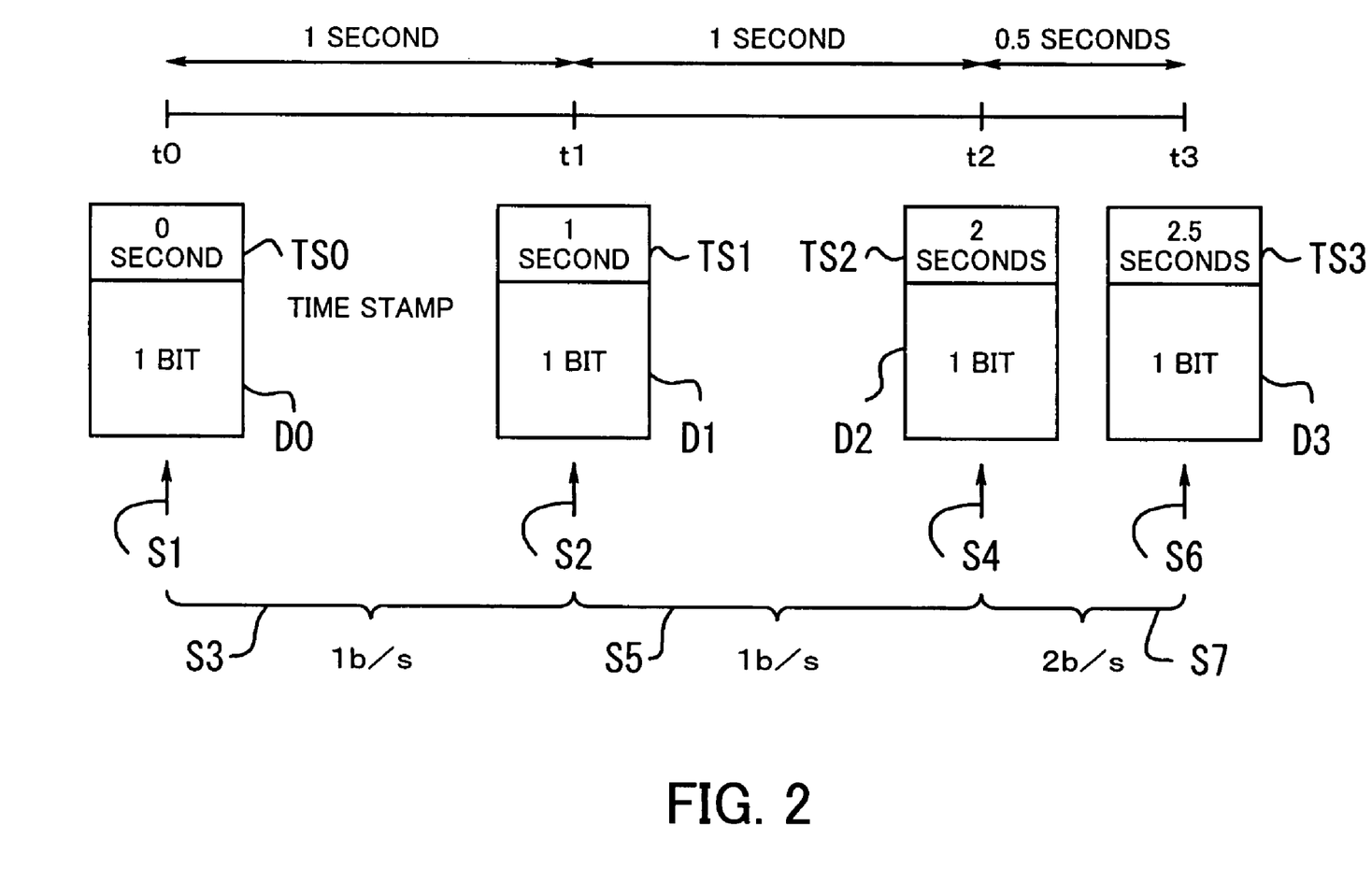
FIG. 2 is a view for describing the operation of recognizing a send rate.

The operation of recognizing a send rate will now be described. FIG. 2 is a view for describing the operation of recognizing a send rate. First, the transmitter 10 adds a time stamp corresponding to packet sending time to a packet on the basis of a clock included in the transmitter 10, and sends the packet. For the sake of simplicity it is assumed that 1-bit data is transmitted.

[S1] At time t0 the transmitter 10 adds a time stamp TS0 (time information indicates zero second) to data D0 and sends the data D0.

[S2] At time t1 the transmitter 10 adds a time stamp TS1 (time information indicates one second) to data D1 and sends the data D1.

[S3] When the send rate recognition section 21 included in the receiver 20 receives the data D0 and D1, the send rate recognition section 21 recognizes from the time stamps TS0 and TS1 added that the interval at which the data D0 and D1 were sent is one second (=1 second−0 second=(time information obtained from the time stamp TS1)−(time information obtained from the time stamp TS0)). The number of bits included in the send data is one, so the send rate recognition section 21 recognizes that a send rate is 1 b/s (=1 bit/1 second) from time t0 to time t1.

[S4] At time t2 the transmitter 10 adds a time stamp TS2 (time information indicates two seconds) to data D2 and sends the data D2.

[S5] When the send rate recognition section 21 receives the data D2, the send rate recognition section 21 recognizes from the time stamps TS1 and TS2 that the interval at which the data D1 and D2 were sent is one second (=2 seconds−1 second=(time information obtained from the time stamp TS2)−(time information obtained from the time stamp TS1)). The number of bits included in the send data is one, so the send rate recognition section 21 recognizes that a send rate is 1 b/s from time t1 to time t2.

[S6] At time t3 the transmitter 10 adds a time stamp TS3 (time information indicates two and a half seconds) to data D3 and sends the data D3.

[S7] When the send rate recognition section 21 receives the data D3, the send rate recognition section 21 recognizes from the time stamps TS2 and TS3 that the interval at which the data D2 and D3 were sent is half of a second (=2.5 seconds−2 seconds=(time information obtained from the time stamp TS3)−(time information obtained from the time stamp TS2)). The number of bits included in the send data is one, so the send rate recognition section 21 recognizes that a send rate is 2 b/s (=1 bit/0.5 seconds) from time t2 to time t3. The send rate recognition section 21 can recognize the send rates in this way on the basis of the information obtained from the time stamps the transmitter 10 adds to the packets.

Figure 3:
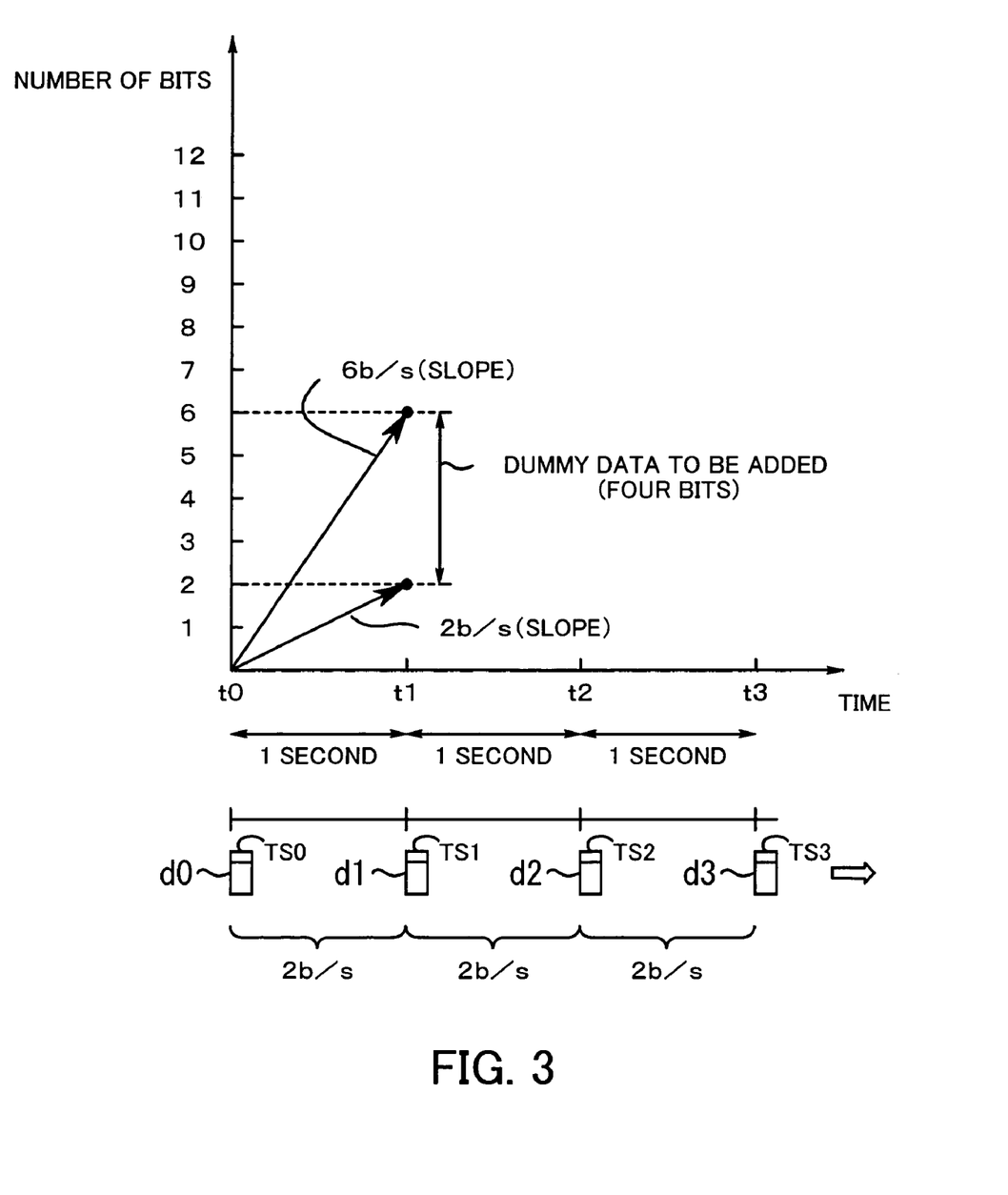
FIG. 3 shows the number of bits included in dummy data to be added.
Figure 4:
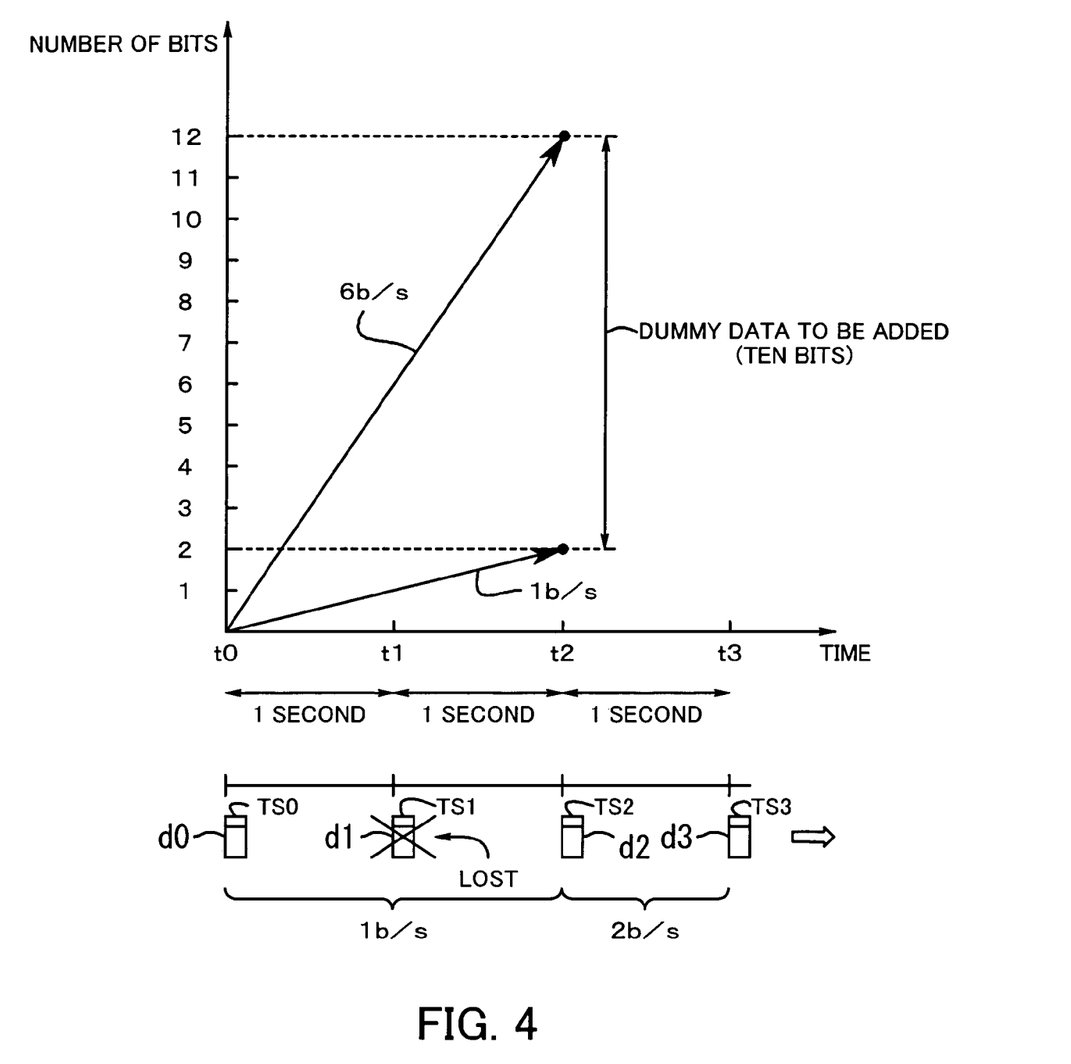
FIG. 4 shows the number of bits included in dummy data to be added.

The operation of adding dummy data will now be described with reference to FIGS. 3 through 5. FIGS. 3 and 4 show the number of bits included in dummy data to be added. In each of FIGS. 3 and 4, a vertical axis indicates the number of bits and a horizontal axis indicates time. For the sake of simplicity it is assumed that 2-bit data is transmitted.

It is assumed that the transmitter 10 adds a time stamp TS0 (time information indicates zero second), a time stamp TS1 (time information indicates one second), a time stamp TS2 (time information indicates two seconds), and a time stamp TS3 (time information indicates three seconds) to 2-bit data d0 through d3, respectively, and that the transmitter 10 sends the 2-bit data d0 through d3 at intervals of one second. Moreover, it is assumed that data is read out from the memory 22 included in the receiver 20 at a read rate of 6 b/s.

In FIG. 3, when the send rate recognition section 21 included in the receiver 20 receives the data d0 and d1, the send rate recognition section 21 recognizes from the time stamps TS0 and TS1 added that the interval at which the data d0 and d1 were sent is one second. The number of bits included in the send data is two, so the send rate recognition section 21 recognizes that a send rate is 2 b/s (=2 bits/1 second) from time t0 to time t1.

The read rate is 6 b/s. Therefore, the dummy data addition section 23 adds 4-bit dummy data to the data d0 to correct the difference between the read rate (6 b/s) and the send rate (2 b/s). The dummy data addition section 23 then writes the data d0 and the 4-bit dummy data to the memory 22. Similarly, 4-bit dummy data is added to the data d1 and these pieces of data are written to the memory 22. In addition, 4-bit dummy data is added to the data d2 and these pieces of data are written to the memory 22.

In FIG. 4, the data d1 sent from the transmitter 10 is lost on the network. When the send rate recognition section 21 included in the receiver 20 receives the data d0 and d2, the send rate recognition section 21 recognizes from the time stamps TS0 and TS2 added that the interval at which the data d0 and d2 were sent is two seconds. The number of bits included in the send data is two, so the send rate recognition section 21 recognizes that a send rate is 1 b/s (=2 bits/2 seconds) from time t0 to time t2.

The read rate is 6 b/s. Therefore, the dummy data addition section 23 adds 10-bit dummy data to the data d0 to correct the difference between the read rate (6 b/s) and the send rate (1 b/s). The dummy data addition section 23 then writes the data d0 and the 10-bit dummy data to the memory 22.

Figure 5:
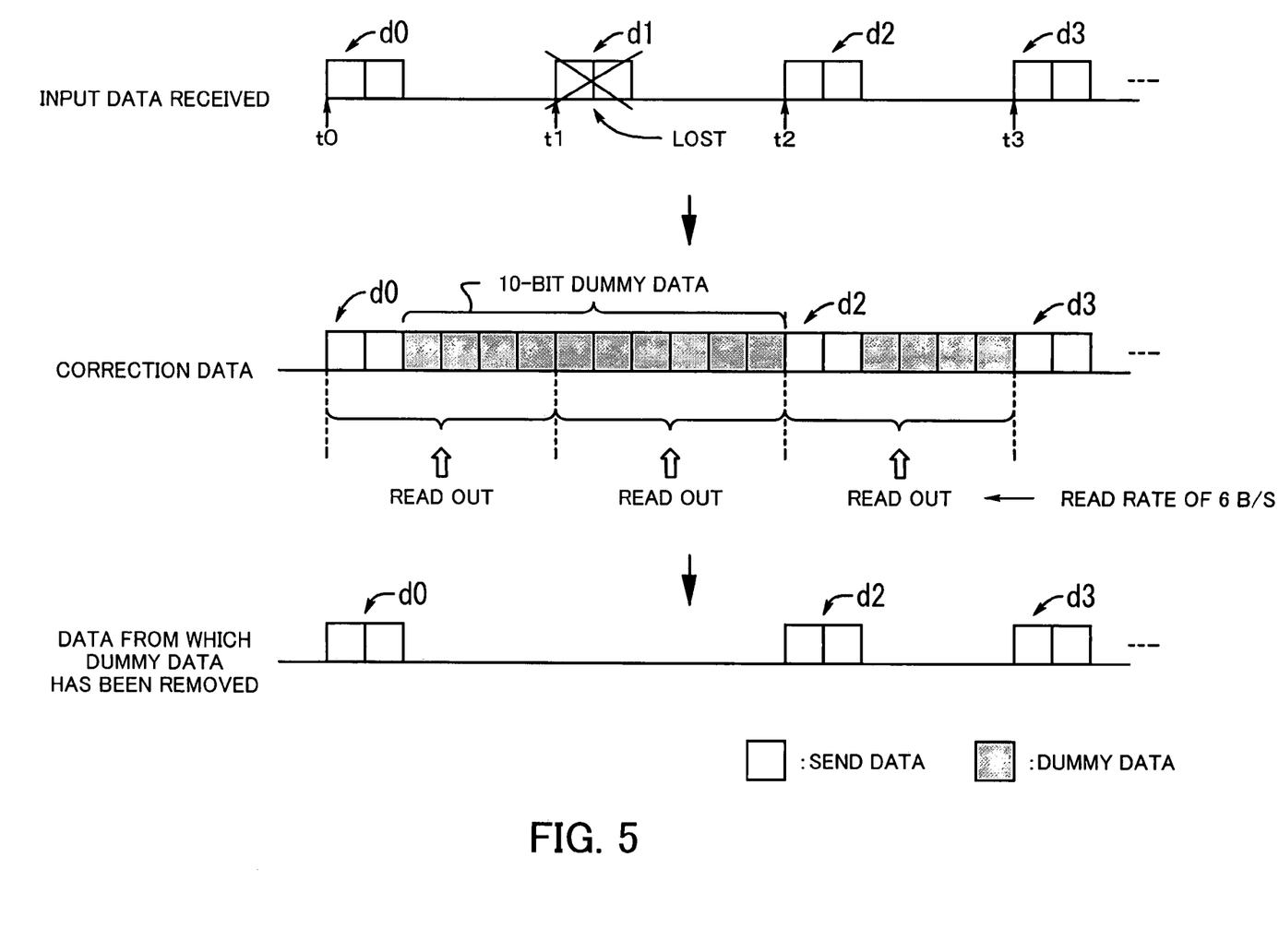
FIG. 5 shows correction data to which dummy data has been added.

FIG. 5 shows correction data to which dummy data has been added. In FIG. 5, the operation of adding the dummy data performed if the send data d1 shown in FIG. 4 is lost is shown. As stated above, if the data d1 is lost, the 10-bit dummy data is added to the data d0 to generate correction data. This correction data is read out from the memory 22 at a read rate of 6 b/s.

If the dummy data is not added and the send data is written to the memory 22, then the send data is stored closely in the memory 22 and a storage area in the memory 22 which was to be occupied by the data d1 is occupied by the send data other than the data d1. Accordingly, when the data is read out from the memory 22 at a constant read rate, the intervals at which the data is read out from the memory 22 do not become equal to the intervals at which the data was sent.

In the present invention, the dummy data is added to the send data and these pieces of data are written to the memory 22. Therefore, even if the data d1 is lost, the send data other than the data d1 is not written to a storage area in the memory 22 which was to be occupied by the data d1. When the data is read out from the memory 22 at a constant read rate, the intervals at which the data is read out from the memory 22 become equal to the intervals at which the data was sent (In FIG. 5, 6-bit dummy data is read out in place of the lost data d1, but all the dummy data is removed by the dummy data removal section 25 at the next stage).

An overview of the operation in the present invention has been given with loss of data as an example. In the present invention, however, intervals at which data is sent can accurately be re-created by the same operation even at the time of receiving VBR data which is not sent at constant intervals.

Figure 6:
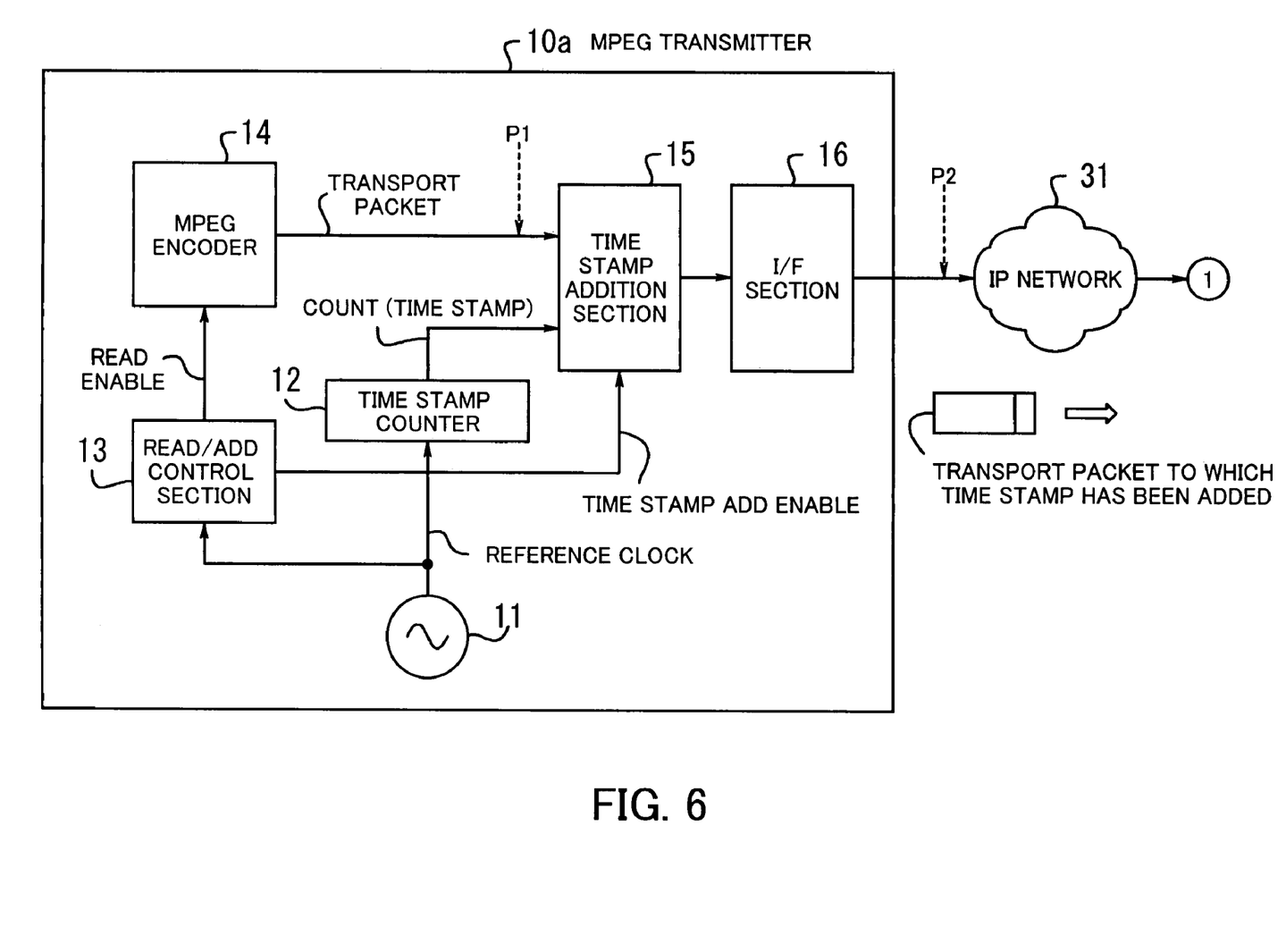
FIG. 6 shows the structure of an MPEG transmitter.
Figure 7:
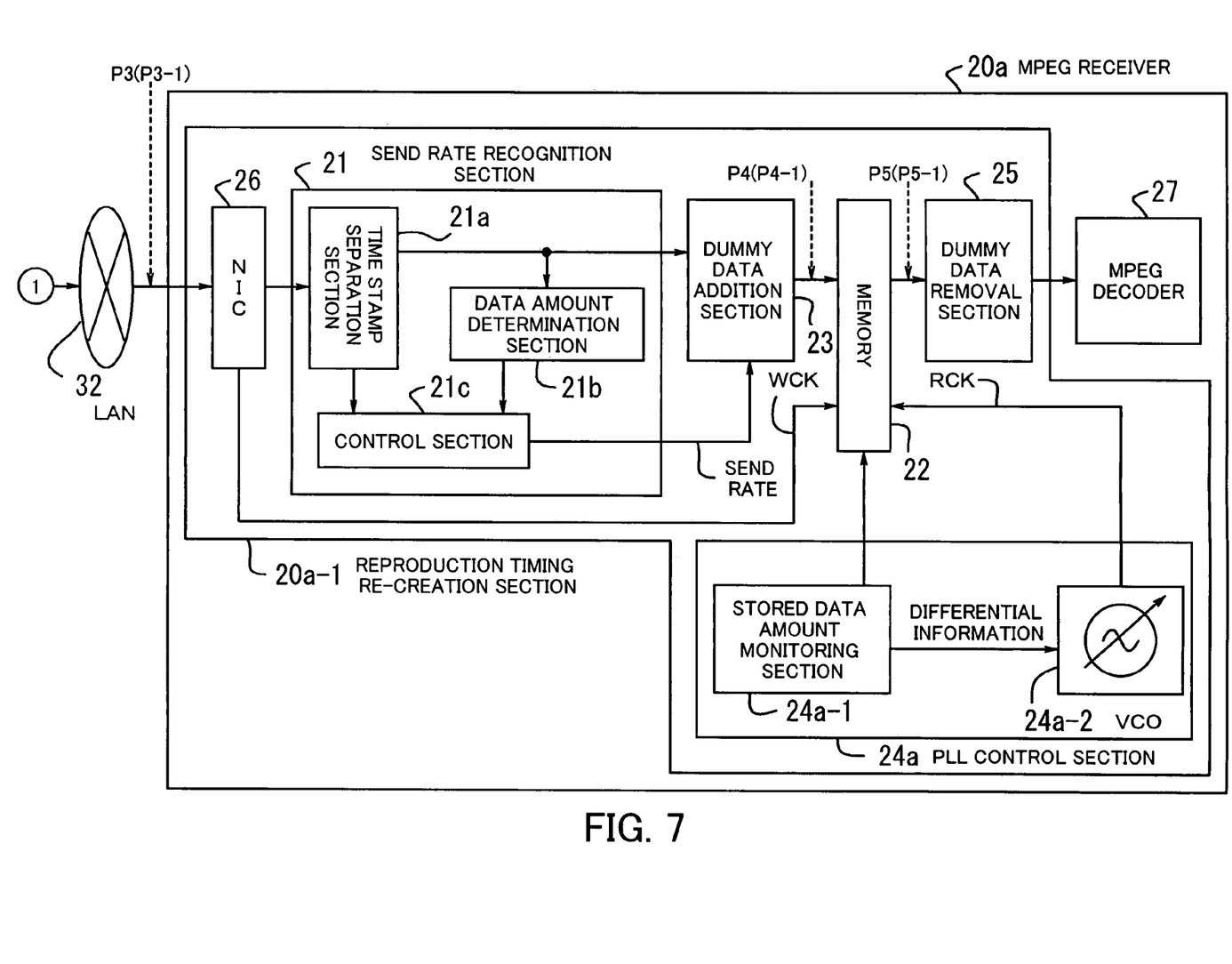
FIG. 7 shows the structure of an MPEG receiver.

The case where the present invention is applied to an MPEG system will now be described. FIG. 6 shows the structure of an MPEG transmitter. FIG. 7 shows the structure of an MPEG receiver.

An MPEG transmitter 10*a* shown in FIG. 6 includes an oscillator 11, a time stamp counter 12, a read/add control section 13, an MPEG encoder 14, a time stamp addition section 15, and an I/F section 16.

The oscillator 11 generates a reference clock necessary for the MPEG transmitter 10*a* to operate, and inputs the reference clock to the time stamp counter 12 and the read/add control section 13. The time stamp counter 12 counts on the basis of the reference clock. The read/add control section 13 outputs a read enable to the MPEG encoder 14 and outputs a time stamp add enable to the time stamp addition section 15.

The MPEG encoder 14 codes MPEG data, generates a transport packet (which is a fixed-length packet made up of 188 bytes and a plurality of which make up a transport stream) used for communication and broadcasting, and outputs the transport packet on the basis of the read enable. The time stamp addition section 15 adds a count outputted from the time stamp counter 12 when the time stamp addition section 15 receives the time stamp add enable to the transport packet as a time stamp. The I/F section 16 converts the format of the transport packet to which the time stamp has been added to satisfy IP, and outputs the transport packet to an IP network 31.

An MPEG receiver 20*a* shown in FIG. 7 includes a send rate recognition section 21, a memory 22, a dummy data addition section 23, a PLL control section 24*a* (corresponding to the read clock generation section 24), a dummy data removal section 25, an NIC 26, and an MPEG decoder 27 (a block including all the components except the MPEG decoder 27 corresponds to a reproduction timing re-creation section 20*a*-1). The send rate recognition section 21 includes a time stamp separation section 21*a*, a data amount determination section 21*b*, and a control section 21*c*. The PLL control section 24*a* includes a stored data amount monitoring section 24*a*-1 and a VCO 24*a*-2.

When the NIC 26 which functions as an interface with a LAN 32 receives send data sent from the MPEG transmitter 10*a* via the IP network 31 and the LAN 32, the NIC 26 extracts effective data (transport packet) from the send data. The NIC 26 also outputs a transmission clock on the LAN 32 connected thereto as a write clock WCK for writing data to the memory 22.

The time stamp separation section 21*a* separates the time stamp from the transport packet. The data amount determination section 21*b* determines the amount of data included between time stamps. (In this case, a time stamp is added to each packet. Each packet is a fixed-length packet and is made up of 188 bytes. Accordingly, the amount of data included between time stamps is 188 bytes. However, the data amount determination section 21*b* is located for accommodating variable-length packet communication.) The control section 21*c* calculates a send rate from the time stamp and the amount of the data.

On the basis of a read rate set for reading out data from the memory 22, the dummy data addition section 23 adds dummy data for correcting the difference between the read rate and the send rate to the transport packet and treats the dummy data and the transport packet as data to be written to the memory 22. The memory 22 stores the transport packet to which the dummy data has been added on the basis of the write clock WCK.

The stored data amount monitoring section 24a-1 monitors the differential between the amount of data stored in the memory 22 and a set threshold, and outputs differential information. The VCO 24a-2 changes its oscillation frequency on the basis of the differential information so that the differential between the amount of data stored in the memory 22 and the set threshold will become zero, and generates and outputs a read clock RCK which is equal to the read rate.

The dummy data removal section 25 removes the dummy data from the read data read on the basis of the read clock RCK. The MPEG decoder 27 decodes the transport packet outputted from the dummy data removal section 25.

Figure 8:
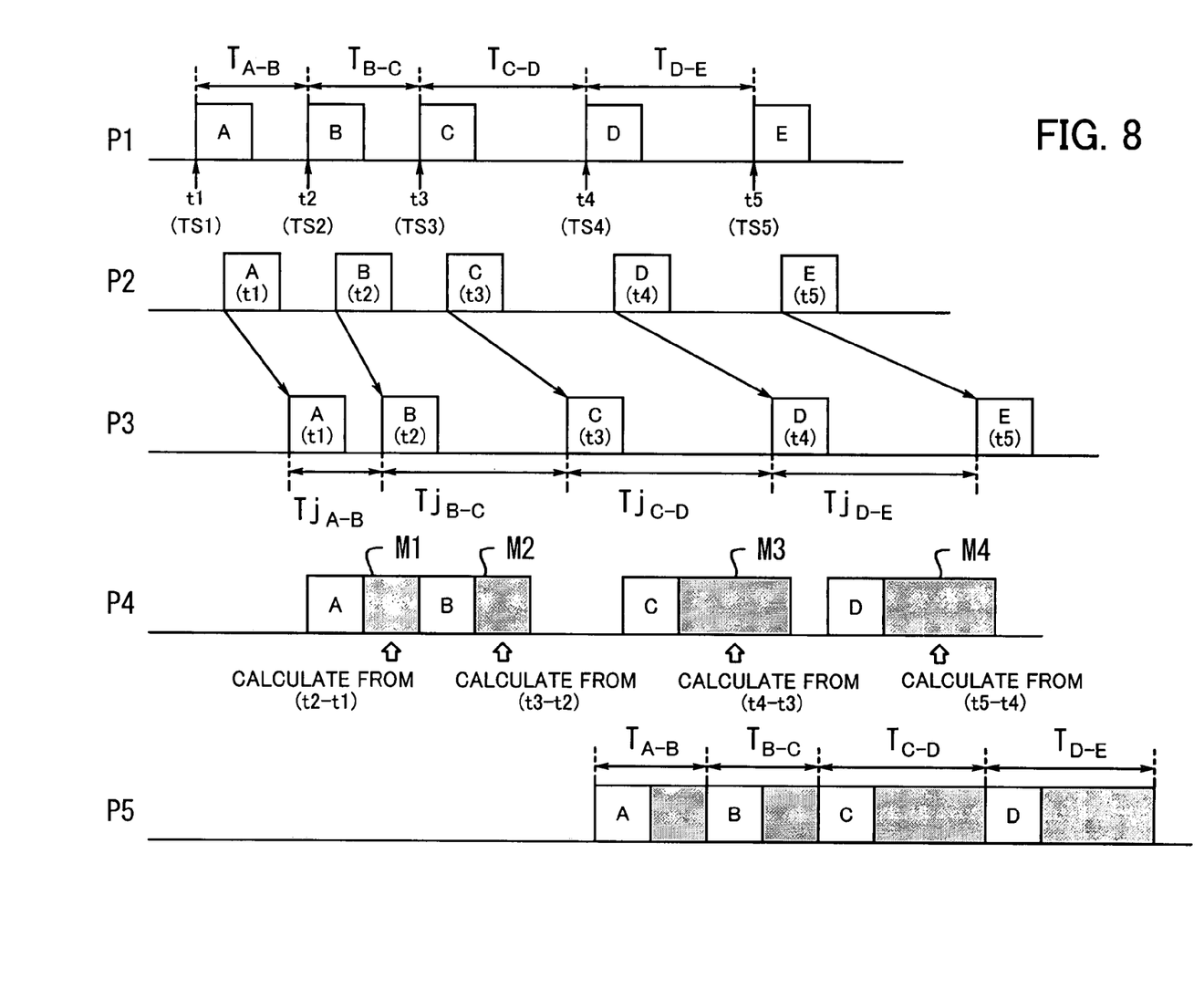
FIG. 8 is a time chart showing operation performed at the time of receiving VBR data.

The operation will now be described by using a time chart. FIG. 8 is a time chart showing operation performed at the time of receiving VBR data. Data P1 is output from the MPEG encoder 14, data P2 is output from the I/F section 16, data P3 is input to the NIC 26, data P4 is output from the dummy data addition section 23, and data P5 is output from the memory 22.

[P1] The MPEG encoder 14 included in the MPEG transmitter 10a outputs transport packets A through E. The time stamp addition section 15 adds time stamps TS1 through TS5 to the transport packets A through E respectively. It is assumed that pieces of time information given by the time stamps TS1 through TS5 are t1 through t5 respectively.

The intervals at which the transport packets are sent are not constant. If the interval at which the transport packets A and B are sent is $T_{A-B}$, the interval at which the transport packets B and C are sent is $T_{B-C}$, the interval at which the transport packets C and D are sent is $T_{C-D}$, and the interval at which the transport packets D and E are sent is $T_{D-E}$, then $T_{A-B}=T_{B-C}<T_{C-D}=T_{D-E}$. That is to say, the intervals at which the transport packets are sent become longer.

[P2] The I/F section 16 included in the MPEG transmitter 10a outputs the transport packets A through E to which the time stamps TS1 through TS5, respectively, have been added to the network in order.

[P3] The NIC 26 included in the MPEG receiver 20a receives the transport packets A through E. However, it is assumed that time taken to arrive at the NIC 26 differs among the transport packets because of delay factors in network transmission (variation in time taken to arrive is referred to as a jitter). In this example, it is assumed that the interval $Tj_{A-B}$ at which the transport packets A and B are received is shorter than $T_{A-B}$ and that the interval $Tj_{B-C}$ at which the transport packets B and C are received is longer than $T_{B-C}$.

[P4] The send rate recognition section 21 calculates the interval at which the transport packets A and B are sent from the time stamps TS1 and TS2 (t2−t1 =$T_{A-B}$) and recognizes a send rate at time $T_{A-B}$ from this calculation result and the amount of packet data. The dummy data addition section 23 then adds dummy data M1 for correcting the difference between the read rate at which data is read out from the memory 22 and the send rate to the transport packet A.

The send rate recognition section 21 calculates the interval at which the transport packets B and C are sent from the time stamps TS2 and TS3 (t3−t2=$T_{B-C}$) and recognizes a send rate at time $T_{B-C}$ from this calculation result and the amount of packet data. The dummy data addition section 23 then adds dummy data M2 for correcting the difference between the read rate at which data is read out from the memory 22 and the send rate to the transport packet B. Dummy data M3 and M4 are generated in the same way and are added to the transport packets C and D respectively.

[P5] Data to which dummy data has been added is read out from the memory 22 by using the invariably constant read clock RCK so that the amount of data stored in the memory 22 will be constant. Accordingly, even at the time of receiving VBR data, data can be read out from the memory 22 at intervals at which data is generated at the sending end. Moreover, the memory 22 functions as a jitter buffer. That is to say, a jitter is absorbed by temporarily holding data by the memory 22.

Figure 9:
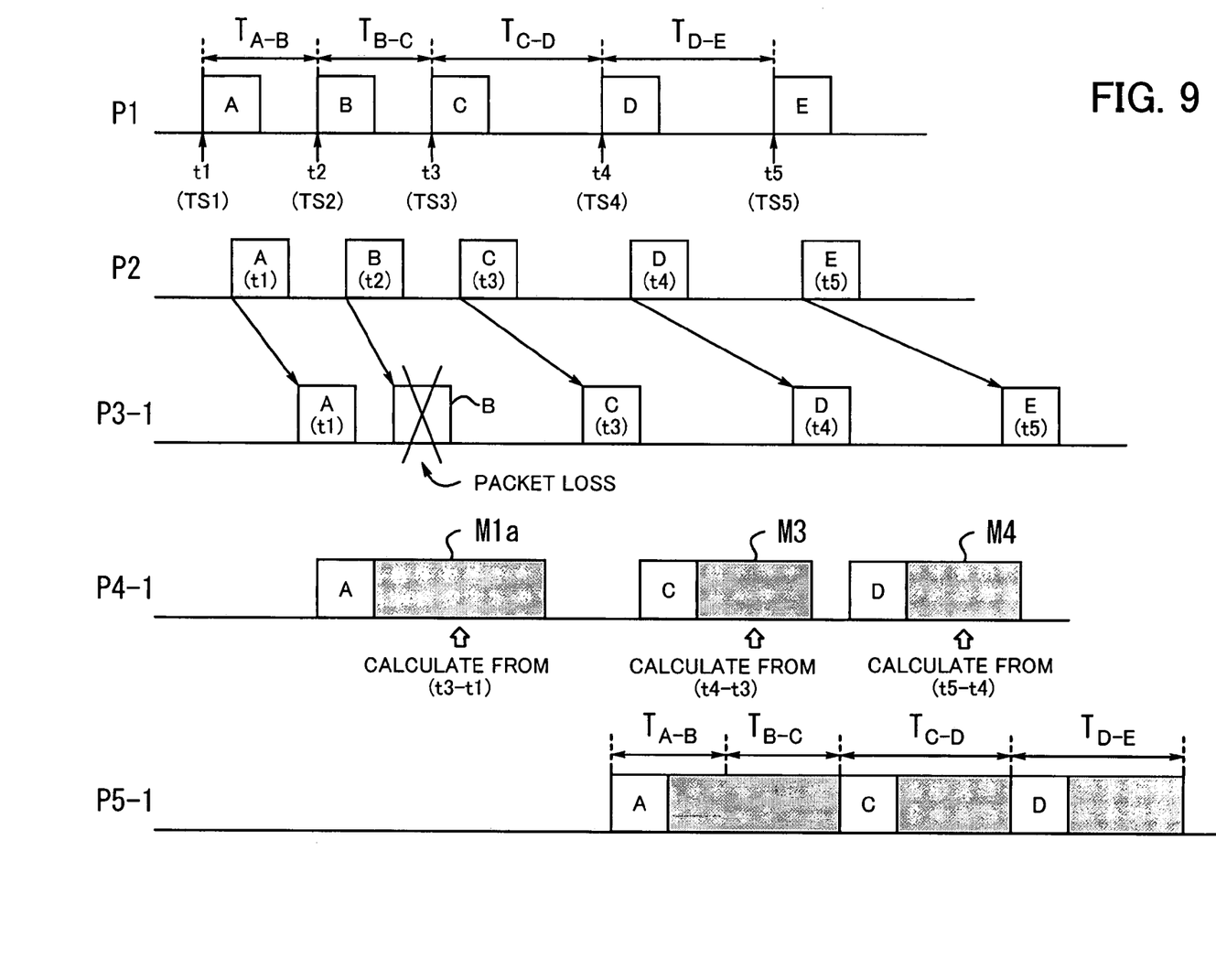
FIG. 9 is a time chart showing operation performed at the time of the occurrence of a packet loss.

FIG. 9 is a time chart showing operation performed at the time of the occurrence of a packet loss. Data P1 and P2 are the same as the data P1 and P2, respectively, shown in FIG. 8, so data P3-1, P4-1, and P5-1 at the receiving end will be described. Data P3-1 is input to the NIC 26, data P4-1 is output from the dummy data addition section 23, and data P5-1 is output from the memory 22.

[P3-1] The NIC 26 included in the MPEG receiver 20a receives the transport packets A through E. However, it is assumed that the transport packet B is lost in network transmission.

[P4-1] The send rate recognition section 21 calculates the interval at which the transport packets A and C are sent from the time stamps TS1 and TS3 (t3−t1=$T_{A-B}+T_{B-C}$) and recognizes a send rate at time ($T_{A-B}+T_{B-C}$) from this calculation result and the amount of packet data. The dummy data addition section 23 then adds dummy data M1a for correcting the difference between the read rate at which data is read out from the memory 22 and the send rate to the transport packet A. In addition, dummy data M3 and M4 are generated and are added to the transport packets C and D respectively.

[P5-1] Data to which dummy data has been added is read out from the memory 22 by using the invariably constant read clock RCK so that the amount of data stored in the memory 22 will be constant. Accordingly, even in the case of the occurrence of a packet loss, data can be read out from the memory 22 at intervals at which data is generated at the sending end.

As stated above, in the present invention dummy data is added when data is inputted to the buffer memory at the receiving end. As a result, a rate is fixed. By doing so, the intervals at which data is generated at the sending end can accurately be re-created even at the time of receiving VBR data or in the case of the occurrence of a packet loss. And furthermore, the case where the present invention is applied to the MPEG image transmitter and receiver has been described. However, the present invention is applicable to various transmitters and receivers which are connected asynchronously.

As has been described in the foregoing, in the communication system according to the present invention, the transmitter sends packets to which time stamps have been added and the receiver recognizes a send rate from the time stamps, stores data to which dummy data for correcting the difference between a read rate set for reading the data from the memory and the send rate has been added in the memory, and reads out the data from the memory. As a result, reproduction timing can accurately be re-created at the receiving end even at the time of receiving VBR data or in the case of the occurrence of a packet loss. Therefore, communication quality can be improved.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication system for performing telecommunication, the system comprising:
   a transmitter for sending packets each including a time stamp; and
   a receiver including:
      a send rate recognition section for recognizing a send rate from the time stamp,
      a memory for storing receive data,
      a data addition section for adding data for correcting a difference between a read rate set for reading out data from the memory and the send rate to data written to the memory,
      a read clock generation section for generating a read clock according to the read rate, and
      a data removal section for removing the data added from the data read out from the memory on the basis of the read clock.

2. An MPEG receiver for receiving an MPEG transport stream, the receiver comprising:
   a reproduction timing re-creation section including:
      a send rate recognition section for recognizing a send rate from a time stamp added to a transport packet at a sending end,
      a memory for storing data,
      a dummy data addition section for adding dummy data for correcting a difference between a read rate set for reading out data from the memory and the send rate to the transport packet written to the memory,
      a PLL control section for monitoring a differential between the amount of data stored in the memory and a set threshold, for generating differential information, for changing an oscillation frequency on the basis of the differential information so as to make the differential between the amount of data stored in the memory and the set threshold zero, and for generating a read clock which is equal to the read rate, and
      a dummy data removal section for removing the dummy data from the data read out from the memory on the basis of the read clock; and
   an MPEG decoder for decoding the transport packet from which the dummy data has been removed.

3. A receiver with the function of controlling a read rate so as to make the amount of target data stored in a storage section included therein for storing receive data constant, the receiver comprising:
   a data addition section for adding variable-length data to the target data on the basis of information included in packet data so as to make the read rate close to a send rate for a coder at a sending end; and
   an added data removal section for, at least, removing the variable-length data included in the read data read out on the basis of the read rate controlled by the variable-length data added and for outputting the read data from which the variable-length data has been removed.

* * * * *